(12) United States Patent
Saijo

(10) Patent No.: US 10,462,350 B2
(45) Date of Patent: *Oct. 29, 2019

(54) CAMERA CONTROL APPARATUS AND CAMERA CONTROL METHOD

(71) Applicant: Sony Corporation, Tokyo (JP)

(72) Inventor: Makoto Saijo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,226

(22) Filed: Apr. 11, 2018

(65) Prior Publication Data

US 2018/0234615 A1 Aug. 16, 2018

Related U.S. Application Data

(63) Continuation of application No. 15/359,669, filed on Nov. 23, 2016, now abandoned, which is a
(Continued)

(30) Foreign Application Priority Data

Nov. 4, 2008 (JP) ................................. 2008-283629

(51) Int. Cl.
*H04N 5/232* (2006.01)
*H04N 7/18* (2006.01)
(Continued)

(52) U.S. Cl.
CPC ..... *H04N 5/23206* (2013.01); *H04N 5/23203* (2013.01); *H04N 5/23296* (2013.01);
(Continued)

(58) Field of Classification Search
CPC ........... H04N 5/232; H04N 7/181; H04N 7/18
(Continued)

(56) References Cited

U.S. PATENT DOCUMENTS 5,517,236 A 5/1996 Sergeant et al.
5,872,594 A 2/1999 Thompson
(Continued)

FOREIGN PATENT DOCUMENTS

JP 1 256876 10/1989
JP 8 279951 10/1996
(Continued)

OTHER PUBLICATIONS

"Vaddio Production View FX: Installation and User Guide", 2007, Document No. 341-451, Rev. B.*
(Continued)

*Primary Examiner* — Patricia I Young
(74) *Attorney, Agent, or Firm* — Haug Partners LLP; William S. Frommer

(57) ABSTRACT

A camera control apparatus includes: an input section to which a plurality of cameras controlled by the apparatus are connected, each of the cameras including a first preset information storage section capable of storing up to n preset information on the state of the camera setting; a second preset information storage section capable of storing (n+1)-th to m-th preset information (n<m) in each camera; an operation input unit to which an operation of selecting a specific one of the cameras and an operation of instructing registration or read out of the preset information on the selected camera are inputted; and a control section registering the preset information in the information storage section when the operation of instructing registration of the preset information is inputted, whereas reading and incorporating the preset information into the state of the selected camera when the operation of instructing readout of the registered preset information is inputted.

9 Claims, 7 Drawing Sheets

Related U.S. Application Data continuation of application No. 13/772,394, filed on Feb. 21, 2013, now Pat. No. 9,538,121, which is a continuation of application No. 12/610,515, filed on Nov. 2, 2009, now Pat. No. 8,405,733.

(51) Int. Cl.
| | | |
|---|---|---|
| *H04N 5/77* | (2006.01) | |
| *H04N 5/247* | (2006.01) | |
| *H04N 5/907* | (2006.01) | |
| *G06F 3/00* | (2006.01) | |
| *H04N 5/00* | (2011.01) | |

(52) U.S. Cl.
CPC .............. *H04N 5/247* (2013.01); *H04N 5/77* (2013.01); *H04N 5/907* (2013.01); *H04N 7/181* (2013.01); *G06F 3/00* (2013.01); *H04N 5/00* (2013.01)

(58) Field of Classification Search
USPC ........................................................ 348/159
See application file for complete search history.

(56) References Cited

U.S. PATENT DOCUMENTS

| | | | |
|---|---|---|---|
| 7,151,558 B1 | 12/2006 | Kogane et al. | |
| 2006/0256195 A1* | 11/2006 | Ogawa | H04N 7/185 |
| | | | 348/143 |
| 2009/0262195 A1 | 10/2009 | Yoshida | |

FOREIGN PATENT DOCUMENTS

| | | |
|---|---|---|
| JP | 10 164420 | 6/1998 |
| JP | 2002 279560 | 9/2002 |
| JP | 2003 67886 | 3/2003 |
| JP | 2004 201241 | 7/2004 |

OTHER PUBLICATIONS

Operating Instructions: Multi-Function Controller—AW-RP655N; 2005.
"Sony—BRC Series Systems"; 2008.
"HD 3CCD Color Video Camera: Operating Instructions—BRC-H700"; 2005.

* cited by examiner

EXEMPLARY CONFIGURATION OF OPERATION INPUT UNIT

FIG.4

| LOGICAL NUMBER | INPUT PORT NUMBER | CAMERA-UNDER-CONTROL NUMBER |
|---|---|---|
| 1 | A | 1 |
| 2 | B | 3 |
| 3 | C | — |
| ⋮ | ⋮ | ⋮ |

FIG.5
EXEMPLARY CONFIGURATION OF PRESET INFORMATION TABLE

| PRESET NUMBER | CLEAR BIT | CAMERA MODEL INFORMATION | PRESET INFORMATION ||||| 
|---|---|---|---|---|---|---|---|
| | | | PAN COORDINATE | TILT COORDINATE | ZOOM POSITION | FOCUS POSITION | IRIS POSITION |
| NO.17 | 0 | CAM-300 | 30 | 20 | 10 | 10 | 20 |
| NO.18 | 1 | CAM-300 | 50 | 50 | 20 | 20 | 30 |
| NO.19 | 0 | CAM-700 | 70 | 60 | 30 | 30 | 10 |
| ... | ... | ... | ... | ... | ... | ... | ... |
| NO.99 | 1 | CAM-300 | 100 | 80 | 20 | 50 | 40 |

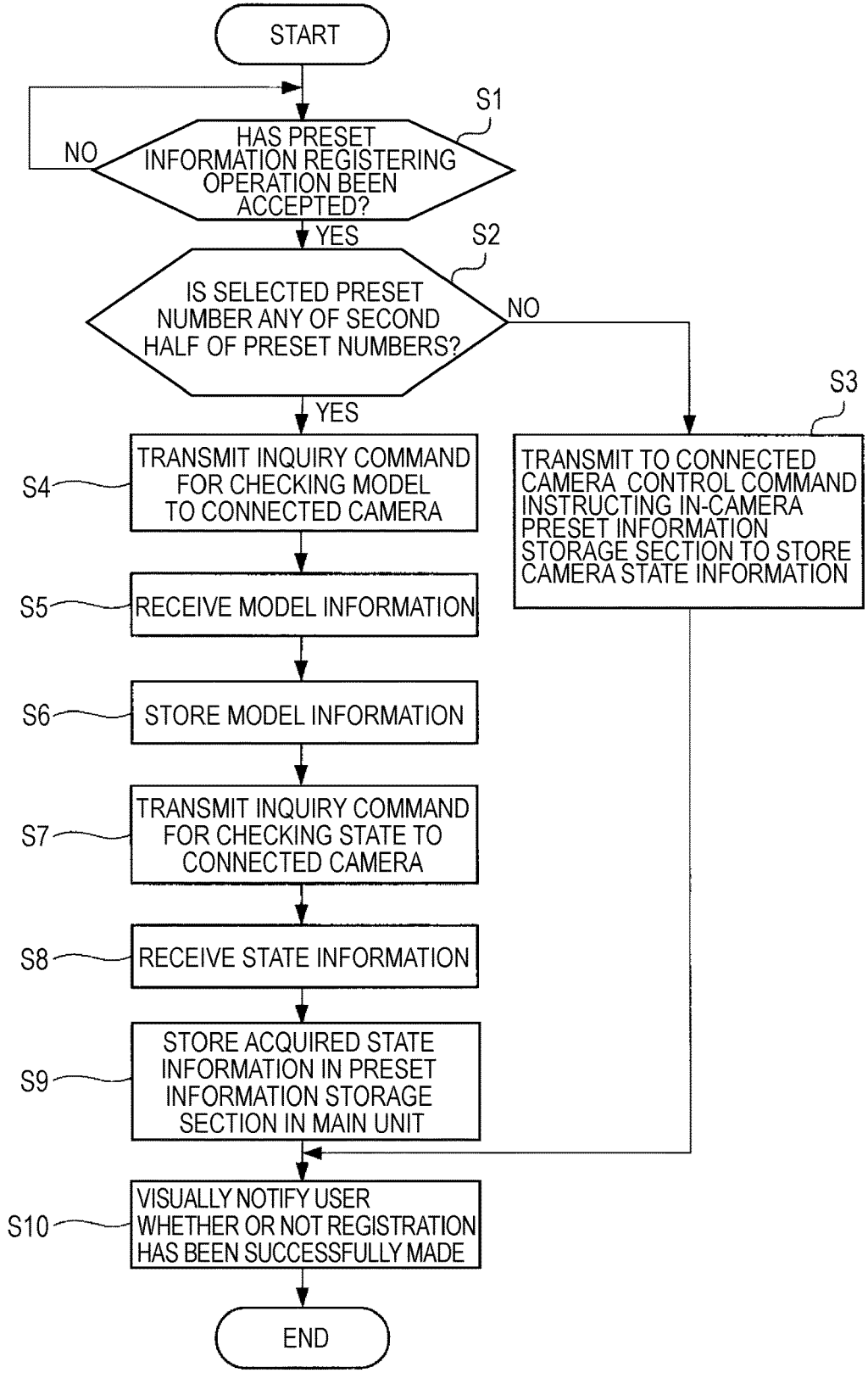

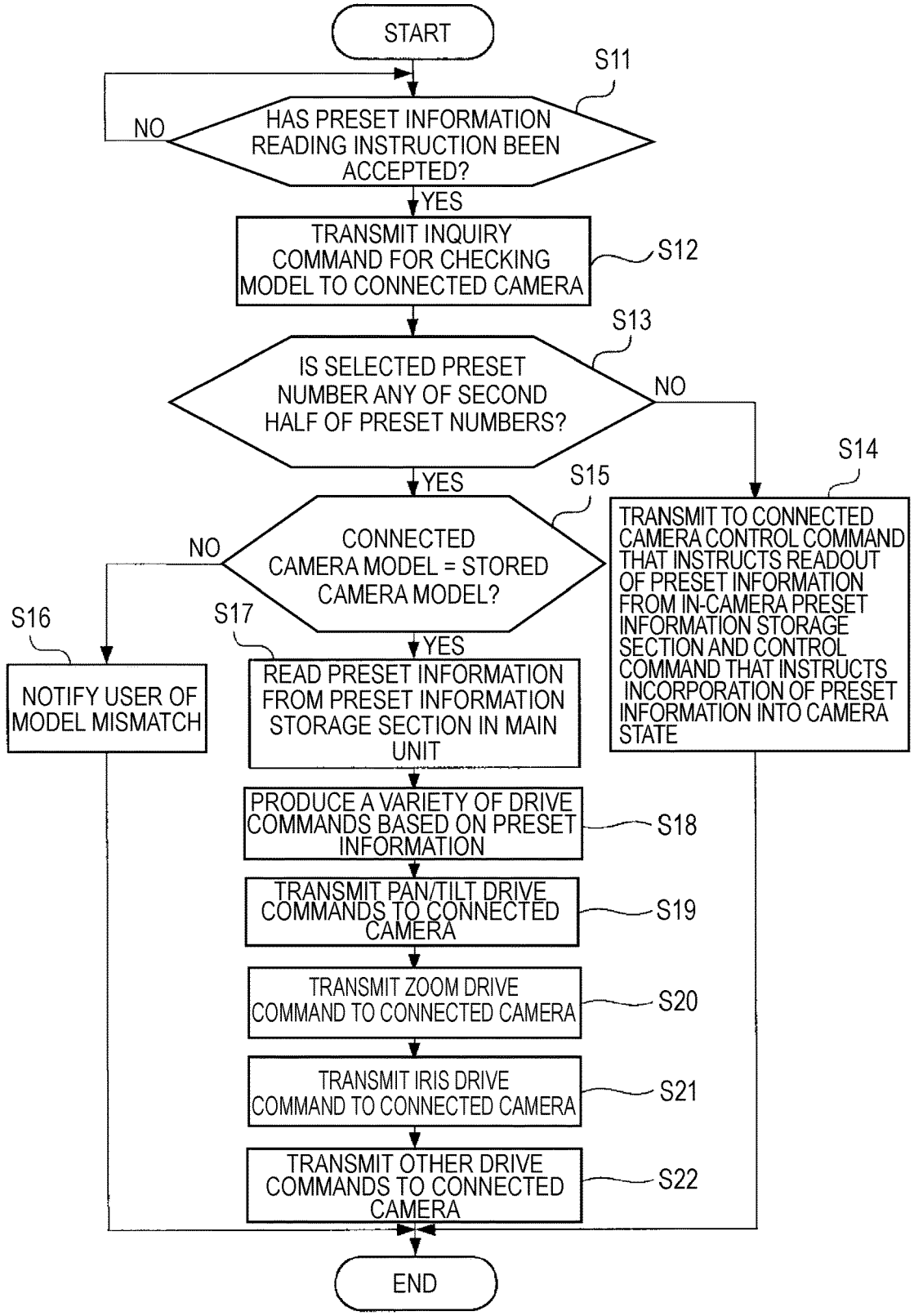

CAMERA CONTROL APPARATUS AND CAMERA CONTROL METHOD

This is a continuation of application Ser. No. 15/359,699, filed Nov. 23, 2016, which is a continuation of application Ser. No. 13/772,394, filed Feb. 21, 2013, now U.S. Pat. No. 9,538,121, issued on Jan. 13, 2017, which is a continuation of application Ser. No. 12/610,515, filed Nov. 2, 2009, now U.S. Pat. No. 8,405,733, issued on Mar. 26, 2013, which is entitled to the priority filing date of Japanese application serial number 2008-283629, Nov. 4, 2008, the entirety of which is incorporated herein by reference.

BACKGROUND OF THE INVENTION

1. Field of the Invention

The present invention relates to a camera control apparatus and a camera control method, and particularly to a camera control apparatus and a camera control method capable of storing preset information on a camera.

2. Description of the Related Art

There has been a camera known to be capable of registering a plurality of patterns of camera state information as preset information formed of a pan coordinate, a tilt coordinate, a zoom position, a white balance value, and other parameters of the camera. In a camera of this type, the preset information is typically stored in a memory or any other suitable storage in the camera. The stored preset information is read as necessary, and the setting contained in the preset information is reflected in the camera.

However, since the capacity of the memory built in the camera is limited, the number of positions that can be registered as preset information is inevitably limited by the capacity of the memory. That is, when the number of pieces of preset information that can be set in a camera in use is, for example, sixteen, a seventeenth piece of preset information cannot be registered. On the other hand, since cameras have been used in a variety of applications, more users have been requesting increase in the capacity of storing preset information. To increase the capacity of storing preset information, an apparatus that controls the action of a camera stores preset information on the camera under control in some cases.

For example, JP-A-2004-201241 discloses a camera control apparatus including a camera capable of performing pivotal actions and an operation unit that controls pan, tilt, and other actions of the camera. In the technology disclosed in JP-A-2004-201241, the operation unit stores the actions of the camera performed when the camera is operated manually through the operation unit.

SUMMARY OF THE INVENTION

According to the method described in JP-A-2004-201241, the area in which preset information is stored (capacity) can be increased. However, according to the technology described in JP-A-2004-201241, all the actions of the camera performed when the camera is manually operated, that is, a plurality of pieces of preset information, are stored in a memory in the operation unit. Therefore, to incorporate the preset information in the state of the camera, the operation unit in which the preset information has been registered needs to be used. That is, the camera and the operation unit need to be used in a one-to-one relationship.

Further, in the related art described in JP-A-2004-201241, when a camera having preset information already registered therein is used, the preset information registered in the camera is disadvantageously difficult to use effectively.

Thus, it is desirable to increase the capacity of storing preset information without compromising an advantageous effect provided by a function in the related art that is the capability of registering preset information on the camera side.

A camera control apparatus according to an embodiment of the invention includes an input section to which a plurality of cameras the action of each of which is controlled by the apparatus are connected, each of the cameras including a first preset information storage section capable of storing up to n pieces of preset information on the state of the camera setting. The camera control apparatus further includes a second preset information storage section capable of storing (n+1)-th preset information to m-th preset information ($n<m$) in each of the plurality of cameras. The camera control apparatus further includes an operation input unit to which an operation of selecting a specific one of the plurality of cameras is inputted and an operation of instructing registration of the preset information on the selected camera or an operation of instructing readout of the preset information on the selected camera is inputted. When the operation of instructing registration of the preset information is inputted through the operation input unit, the preset information is registered in the first or second preset information storage section. When the operation of instructing readout of the registered preset information is inputted through the operation input unit, the preset information is read from the first or second preset information storage section. The read preset information is then incorporated into the state of the selected camera.

According to the above configuration, each of the cameras stores up to n-th preset information, and the camera control apparatus stores (n+1)-th preset information to m-th preset information.

According to the above embodiment of the invention, the capacity of storing preset information can be increased to the point where m pieces of preset information are stored at the maximum, and an advantage provided by storing preset information in each of the cameras can also be provided.

BRIEF DESCRIPTION OF THE DRAWINGS

FIG. 4 is a descriptive diagram showing an exemplary configuration of a logical number/input port number/camera-under-control number relationship table according to an embodiment of the invention;

FIG. 5 is a descriptive diagram showing an exemplary configuration of a preset information table according to an embodiment of the invention;

FIG. 6 is a flowchart showing exemplary processes of registering preset information according to an embodiment of the invention; and FIG. 7 is a flowchart showing exemplary processes of reading preset information according to an embodiment of the invention.

DESCRIPTION OF THE PREFERRED EMBODIMENTS

An embodiment of the invention will be described below with reference to the accompanying drawings. The embodiment will be described in the following order:
1. First embodiment
2. Variations

1. First Embodiment

[Exemplary System Configuration]

Figure 1:
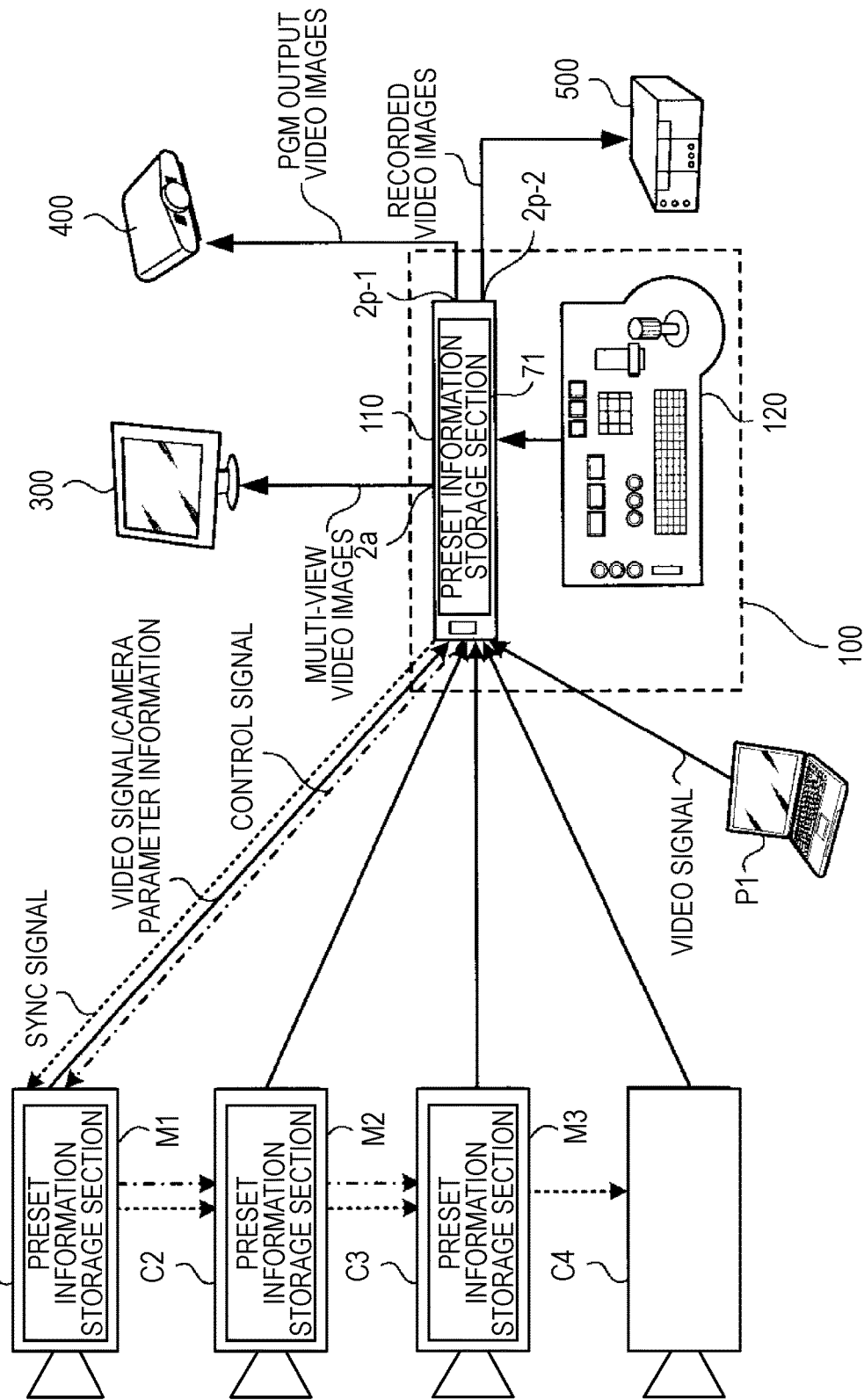
FIG. 1 is a schematic diagram showing an exemplary configuration of a system according to an embodiment of the invention.

FIG. 1 shows an exemplary configuration of a system according to the present embodiment. A camera control apparatus according to the present embodiment of the invention is a video signal processing apparatus 100 having a video switcher function and a camera controller function. The video signal processing apparatus 100 shown in FIG. 1 is formed of a main unit 110 and an operation input unit 120. While the main unit 110 and the operation input unit 120 are separate units in the present embodiment, they may be integrated with each other.

The video signal processing apparatus 100 is a portable apparatus and used to, for example, relay events that take place in a large lecture hall, a large conference room, a live concert hall, and any other similar place and produce video content that introduces how the events have proceeded.

The main unit 110 shown in FIG. 1 is connected to four cameras C1 to C4 and a personal computer (hereinafter referred to as a PC) P1 as sources from which video images are inputted.

The cameras C1 to C4 are connected to SDI (Serial Digital Interface) input terminals (not shown) or any other suitable terminals of the main unit 110, and video images captured by the cameras C1 to C4 are inputted to the main unit 110 via the respective input terminals. The image capturing operation in the cameras C1 to C4 is synchronized with a sync signal supplied from the main unit 110.

Each of the cameras C1 to C3 is provided with a serial interface based on the VISCA® protocol or any other suitable protocol and connected to the main unit 110 via a serial cable (not shown) for transferring a control signal. That is, the main unit 110 can control the cameras C1 to C3 by supplying control signals (camera control commands) thereto. An ACK message or any other similar response from each of the cameras C1 to C3 is also sent over the corresponding serial cable to the main unit 110.

The cameras C1 to C3 further include preset information storage sections M1 to M3 (first preset information storage sections) capable of registering the orientation, zoom factor, exposure, and other parameters of the cameras as preset information. Each of the preset information storage sections M1 to M3 can store n pieces of preset information at the maximum. The number n varies depending on the model of the cameras. For example, the number n of some existing cameras is 16 or 30. Writing and reading preset information to and from the preset information storage sections M1 to M3 are carried out based on control signals transmitted from the main unit 110. In the following description, when it is not necessary to distinguish the preset information storage sections M1 to M3 from one another, they are simply called preset information storage sections M.

The camera C4 is connected to the main unit 110 via a DVI (Digital Visual Interface) cable or any other suitable cable, and video images captured by the camera C4 are transferred to the main unit 110 through a DVI input terminal (not shown). The camera C4, which does not have any terminal to which a control signal from the main unit 110 is inputted, is not controllable by the main unit 110.

The PC P1 is connected to another DVI input terminal, an RGB input terminal, or any other suitable terminal (not shown) of the main unit 110 and inputs still images, motion images, or any other images stored in an HDD (Hard Disk Drive, not shown) or any other storage to the main unit 110.

The main unit 110, which has the video switcher function and the camera control function as described above, switches the output video image between a PGM output video image and a NEXT output video image in the video switcher function mode in which the main unit 110 functions as a video switcher, whereas the main unit 110 controls any of the cameras under control in the camera control mode in which the main unit 110 functions as a camera controller.

In the present embodiment, the main unit 110 also includes a preset information storage section 71 (second preset information storage section) capable of storing preset information on a camera. The preset information storage section 71 is provided in a memory or any other suitable component in the main unit 110, and can store (n+1)-th preset information to m-th preset information. The number m can be set to an arbitrary value in consideration of the capacity and other features of the preset information storage section 71. In the present embodiment, the number m is set at 99. Preset information stored in the preset information storage section 71 can be saved (backed up) in a memory card or any other external storage medium. Alternatively, the preset information can be backed up over a network in a device connectable to the network. In this case, the communication protocol can be Ethernet®, IP, TCP, FTP, or other suitable protocols. The configuration of the main unit 110 and the preset information stored in the preset information storage section 71 will be described later in detail.

The main unit 110 is connected to a destination to which video images are outputted from the main unit 110, for example, a display device 300 formed of an FPD (Flat Panel Display) or any other suitable component, a projector 400, and a recording device 500 formed of an HDD or any other suitable component. In the example shown in FIG. 1, the projector 400 is connected to a PGM output terminal 2$p$-1 of the main unit 110, and PGM output video images are outputted to the projector 400. The display device 300 is connected to an AUX output terminal 2$a$ of the main unit 110, and video images arranged in a multi-view display format or other images are outputted to the display device 300. The recording device 500 is connected to a PGM output terminal 2$p$-2 of the main unit 110, and records a video signal outputted from the main unit 110 as recorded video images.

The operation input unit 120 connected to the main unit 110 transmits an operation signal according to an operation performed by a user to a control section, which will be described later, in the main unit 110. For example, instructions to switch video images outputted from the main unit 110 are issued from the operation input unit 120.

Figure 2:
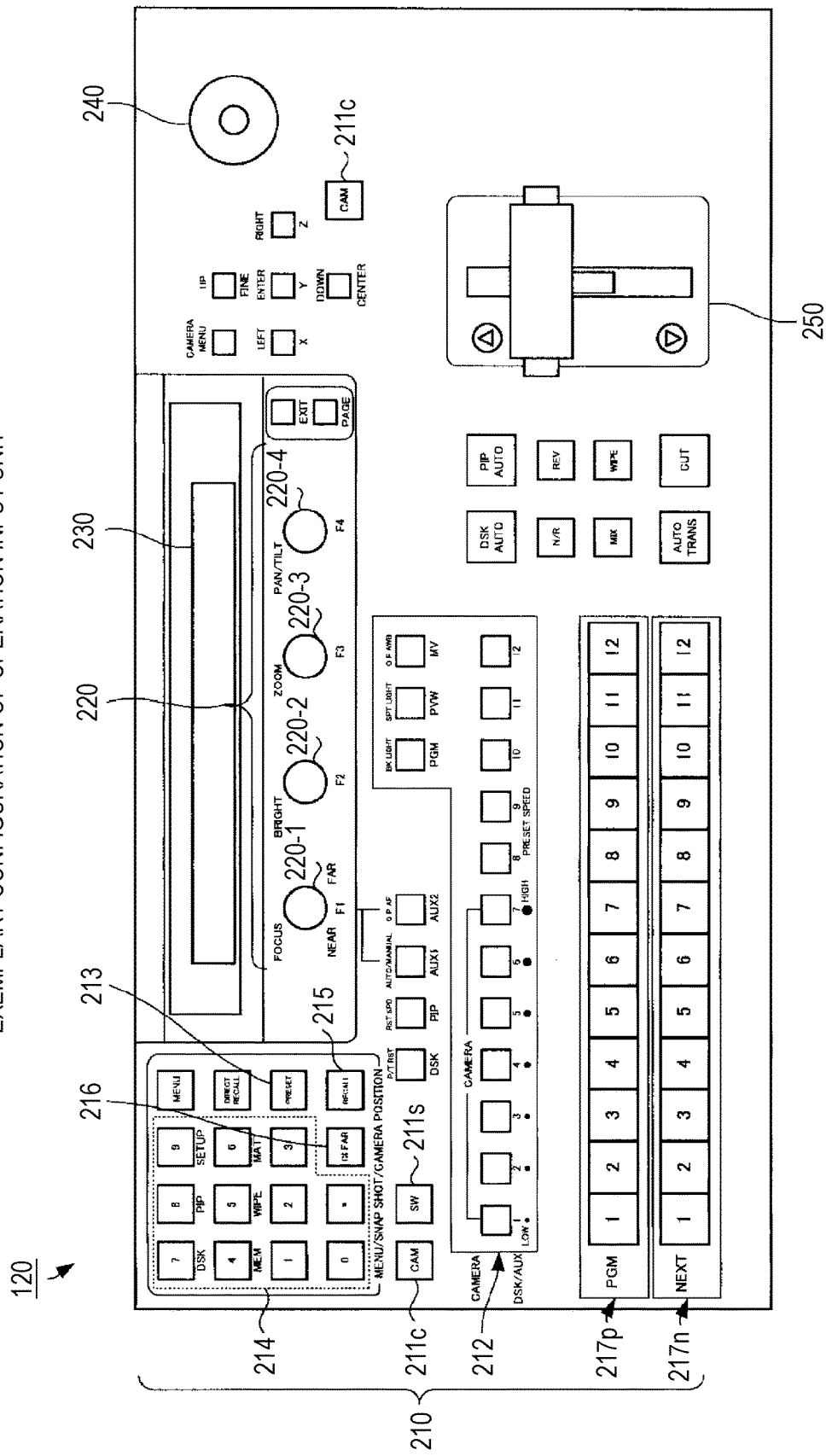
FIG. 2 is a descriptive diagram showing an exemplary configuration of an operation input unit according to an embodiment of the invention.

An exemplary configuration of the operation input unit 120 will be described with reference to FIG. 2. The operation input unit 120 shown in FIG. 2 includes an operation button section 210 formed of a variety of buttons, a dial section 220 formed of four dials, and a display section 230. The operation input unit 120 further includes a joy stick 240 and a transition lever 250.

The operation button section 210 includes a camera mode switching button 211*c* and a switcher mode switching button 211*s* as function selectors, and AUX output selection/camera selection buttons 212. The operation button section 210 further includes a preset button 213, preset number specifying buttons 214, a recall button 215, a clear button 216, PGM selection buttons 217*p*, and NEXT selection buttons 217*n*.

The camera mode switching button 211*c* switches the mode setting in the main unit 110 from the video switcher function mode to the camera control mode. The switcher mode switching button 211*s* switches the mode setting from the camera control mode to the video switcher function mode. The actual mode switching operation is carried out under the control of the control section 60, which will be described later, when either of the switching buttons is pressed.

The AUX output selection/camera selection buttons 212 function as AUX output selection buttons in the video switcher function mode, whereas functioning as camera selection buttons in the camera control mode. Logical numbers 1 to 12 are assigned to the AUX output selection/camera selection buttons 212. The buttons labeled with 1 to 12 are enabled when the video switcher function mode is chosen, whereas only the buttons labeled with 1 to 7 are enabled when the camera control mode is chosen.

When the AUX output selection/camera selection buttons 212 function as the AUX output selection buttons, and any of the selection buttons is pressed, a video signal inputted through the input port related in advance to the logical number assigned to the pressed button is outputted to the AUX output terminal 2*a*. In the example shown in FIG. 1, since the display device 300 is connected to the AUX output terminal 2*a*, video images inputted through the input port related to the logical number described above are displayed on the screen of the display device 300.

When the AUX output selection/camera selection buttons 212 function as the camera selection buttons, video images inputted from the camera under control that is related in advance to the logical number selected by a button pressing operation are outputted through the AUX output terminal 2*a*. The video images captured by the selected one of the cameras under control and outputted through the AUX output terminal 2*a* are displayed on the screen of the display device 300. The AUX output selection/camera selection buttons 212, when functioning as the camera selection buttons, also function as buttons for selecting a camera to and from which preset information is written and read.

The preset button 213 registers, as preset information, the information on the state of any of the cameras having been adjusted by using the dial section 220 and the joy stick 240, which will be described later. The preset number specifying buttons 214 specify preset numbers. The preset numbers are provided to manage a plurality of pieces of preset information, and the number of present numbers corresponds to the number of pieces of preset information stored in the preset information storage section 71. Since the preset information storage section 71 according to the present embodiment can register m pieces of preset information, the preset numbers range from 1 to m.

After the user has adjusted the state of any of the cameras to an arbitrary state, specifying a preset number by pressing any of the preset number specifying buttons 214 and subsequently pressing the preset button 213 cause the state of the camera to be related to the specified preset number and stored. The operation of storing the preset information is carried out under the control of the control section, which will be described later. When the specified preset number is any of the first half of the preset numbers, numbers ranging from 1 to n, the preset information is stored in the camera. When the specified preset number is any of the second half of the preset numbers, numbers ranging from n+1 to m, the preset information is stored in the main unit 110 side.

The recall button 215 issues an instruction to read preset information. After a preset number is specified by pressing any of the preset number specifying buttons 214, pressing the recall button 215 causes the preset information related to the specified preset number to be read. The operation of reading preset information is also carried out under the control of the control section, which will be described later. When the specified preset number is any of the first half of the preset numbers, the preset information is read from the preset information storage section M in the camera. When the specified preset number is any of the second half of the preset numbers, the preset information is read from the preset information storage section 71 in the main unit 110.

The clear button 216 deletes preset information having been set. Pressing the clear button 216 causes a default value set at the time of factory shipment to be read in the following preset information reading operations instead of the preset information having been set. Preset information to be cleared is determined by pressing the corresponding one of the preset number specifying buttons 214. For example, when the preset numbers 20 to 60 are selected, the preset information related to the preset numbers 20 to 60 is deleted.

The PGM selection buttons 217*p* and the NEXT selection buttons 217*n* are provided to perform the video switcher function. The PGM selection buttons 217*p* determine which one of the video signals inputted from the cameras C1 to C4, the PC P1, and any other apparatus connected to the main unit 110 is selected as a programmed output (PGM output). The NEXT selection buttons 217*n* determine which one of the video signals inputted to the main unit 110 is selected as the standby video output (NEXT output, which is also referred to as a preview output).

The same logical numbers 1 to 12 as those assigned to the AUX output selection/camera selection buttons 212 are also assigned to the PGM selection buttons 217*p* and the NEXT selection buttons 217*n*. For example, when any of the PGM selection buttons 217*p* is pressed, the video signal inputted through the input port related in advance to the logical number selected by the button pressing operation is selected as the PGM output.

The dial section 220 is formed of four dials, a dial 220-1 to a dial 220-4. When the camera control mode is chosen, the dial 220-1 functions as a dial for adjusting the focus of any of the cameras under control. The dial 220-2 functions as a dial for adjusting the brightness. The dial 220-3 functions as a dial for adjusting the zoom. The dial 220-4 functions as a dial for adjusting the pan and tilt. When preset information is registered, adjusting the dials that form the dial section 220 allows camera parameters that the user wants to register as preset information to be produced.

When the video switcher function mode is chosen, the dials 220-1 to 220-4 function as dials for adjusting the functions assigned to functions F1 to F4.

The display section 230 is formed of a VFD (Vacuum Fluorescent Display) or any other suitable component and displays the setting of an effect exerted on a video image when the video image is switched to another, a setting menu used to set any of the cameras under control, and other items.

The joy stick 240 is formed of a lever supported pivotally in X-axis, Y-axis, and Z-axis directions and a dial provided below the lever. When the camera control mode is chosen, the amounts of pan, tilt, and zoom control of any of the connected cameras can be specified by inclining the lever of the joy stick 240 or rotating the dial thereof. That is, the state of the camera that the user wants to register as preset information can be produced by operating the joy stick 240.

When the video switcher function mode is chosen, the joy stick 240 is used as an operation member for determining the on-screen position of a PinP (Picture in Picture) inserted in a PGM output video image.

The transition lever 250 shiftable in the up/down direction is an operation member for performing the video switcher function. The transition lever 250 continuously changes a video image to another in accordance with the amount of shift in the up/down direction.

Figure 3:
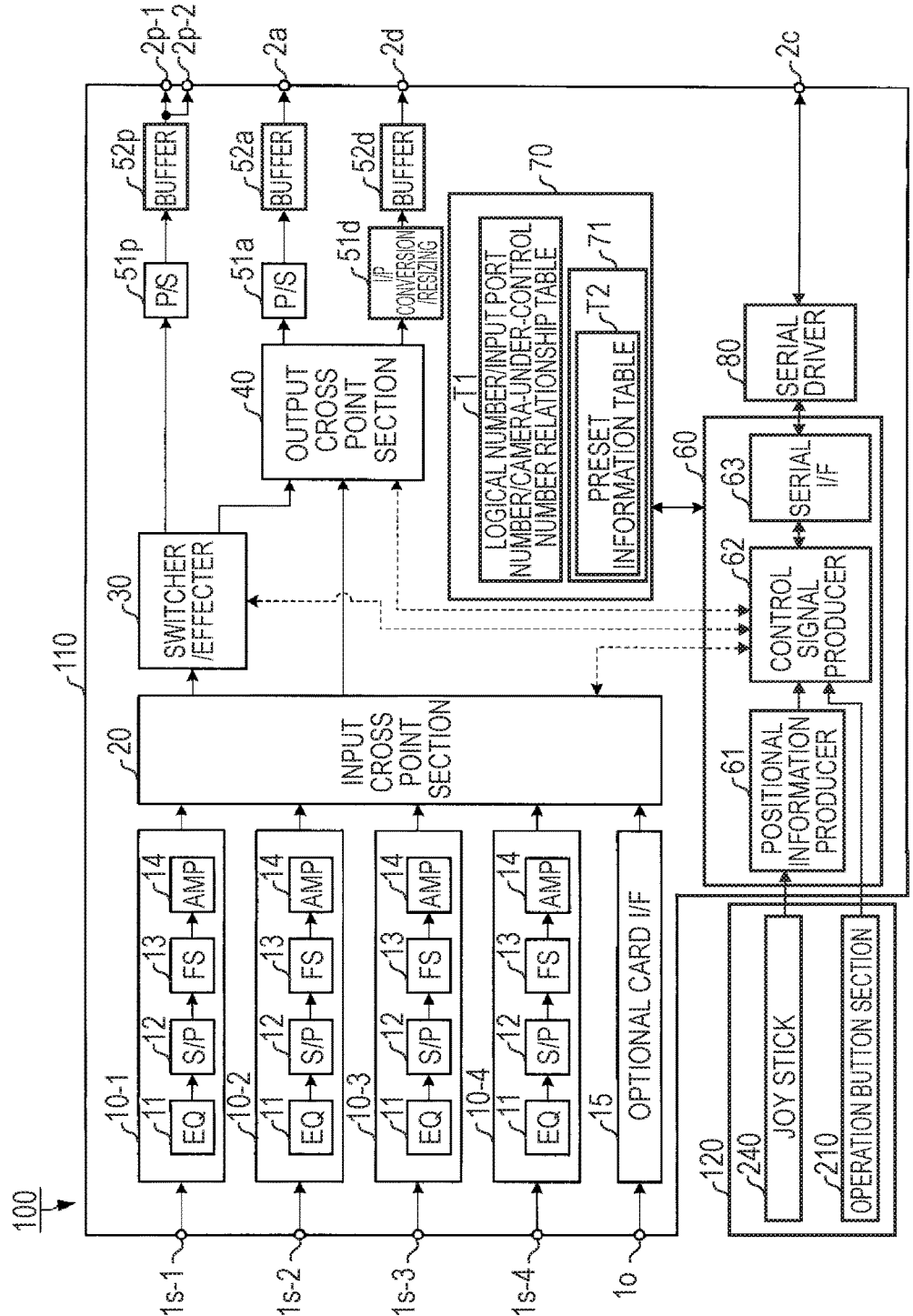
FIG. 3 is a block diagram showing an exemplary internal configuration of a video signal processing apparatus according to an embodiment of the invention.

An exemplary internal configuration of the main unit 110 will be described with reference to FIG. 3. In FIG. 3, the portions corresponding to those in FIGS. 1 and 2 have the same reference characters. The main unit 110 includes an SDI interface (hereinafter referred to as an I/F) 10-1 to an SDI I/F 10-4 and an optional card I/F 15 as input sections. The SDI I/F 10-1 to SDI I/F 10-4 include four respective SDI input terminals 1s-1 to 1s-4, to each of which an HD-SDI or SD-SDI signal is inputted. According to the configuration shown in FIG. 1, the video signals outputted from the cameras C1 to C4 are inputted to the SDI I/F 10-1 to SDI I/F 10-4.

Each of the SDI I/F 10-1 to SDI I/F 10-4 includes an equalizer (EQ) 11, a serial/parallel converter (S/P) 12, a frame synchronizer (FS) 13, and an amplifier (AMP) 14.

The equalizer 11 shapes the waveform of an inputted HD/SD-SDI signal and supplies the signal having undergone the waveform shaping to the serial/parallel converter 12. The serial/parallel converter 12 converts the HD/SD-SDI serial signal supplied from the equalizer 11 into a parallel signal and outputs it to the frame synchronizer 13. The frame synchronizer 13 supplies the inputted parallel video signal to the amplifier 14 in synchronization with a reference sync signal in the main unit 110. The amplifier 14 amplifies the inputted video signal to an appropriate magnitude and supplies the amplified signal to an input cross point section 20 as an input selector.

The optional card I/F 15 is an I/F into which an optional card is inserted. An optional card is a card that is not assembled at the time of factory shipment but adds a function that is not implemented as a standard function. A variety of optional cards are available, such as a card with an analog video signal input terminal, a card with a DVI input terminal, and a card with an HD/SD-SDI input terminal. In the main unit 110 according to the present embodiment, any two of the cards described above at the maximum can be connected to the optional card I/F 15. Therefore, a plurality of video signal terminals are present on the optional card I/F 15. FIG. 3 however collectively shows these terminals in the form of an input video terminal 10 to simplify the description.

In the configuration shown in FIG. 1, the optional card I/F 15 receives a video signal from the PC P1 connected to the terminal of an optional card inserted into the optional card I/F 15. Processing operations according to the type of the assembled card are carried out in the optional card I/F 15, which then outputs the processed video signal to the input cross point section 20. The type of the inputted video signal is not limited to those described above, but cards with other types of input terminals may be assembled.

The input cross point section 20 selects only the video signal selected by the user through an input video image selection operation performed on the operation input unit 120 among a plurality of video signals supplied through the SDI I/F 10-1 to SDI I/F 10-4 and the optional card I/F 15, and outputs the selected video signal. For example, when the first PGM selection button 217p on the operation input unit 120 shown in FIG. 2 is pressed, the input cross point section 20 selects the video signal inputted through the input port related to the logical number 1 as the PGM output. That is, the input cross point section 20 relates the inputted video image to any of the NEXT output, the AUX output, the PinP output, the multi-view output, and any other suitable output and then outputs the video image.

When the video signal selected by the input cross point section 20 needs to be processed, for example, when an effect needs to be exerted on the selected video signal, the video signal is supplied to a switcher/effecter 30 as a screen producer. The switcher/effecter 30, for example, selects an input video image and exerts an effect on a video signal.

The switcher/effecter 30 also produces a frame for displaying a PinP image and frames used in the multi-view display format. When frames used in the multi-view display format are produced, the frame for displaying a PGM output video image, the frame for displaying a NEXT output video image, and the frame for displaying a video image captured by any of the cameras under control are produced in such a way that the colors of the frames differ from one another. The process of producing the frames used in the multi-view display format will be described later in detail. Processes performed in the switcher/effecter 30 are controlled based on a control signal produced in a control section 60, which will be described later, based on an input video image selection operation performed on the operation input unit 120.

The video signal processed in the switcher/effecter 30, for example, the video signal on which an effect has been exerted, and selected as the PGM output is supplied to a parallel/serial converter 51p disposed downstream of the switcher/effecter 30. The parallel/serial converter 51p converts the video signal into a serial video signal and outputs it to a buffer 52p. The video signal inputted to the buffer 52p is converted into a signal appropriate for an output operation and then outputted as the PGM output.

The video signal processed in the switcher/effecter 30, for example, the video signal on which an effect has been exerted, is also supplied to an output cross point section 40 along with the frame information and other information produced in the switcher/effecter 30. The output cross point section 40 also receives a video signal selected by the input cross point section 20 as a video signal on which no effect needs to be exerted.

The output cross point section 40 chooses either the AUX output terminal 2a or a DVI output terminal 2d as an output section to which the video signal supplied from the input cross point section 20 and the video signal supplied from the switcher/effecter 30 are outputted. Choosing either the AUX output terminal 2a or the DVI output terminal 2d as the output section is determined based on a control signal produced in the control section 60 based on an input video image selection operation performed on the operation input unit 120.

The video signal selected by the output cross point section 40 as the video signal to be outputted to the AUX output terminal 2a is supplied to a parallel/serial converter 51a disposed downstream of the output cross point section 40 and converted into a serial video signal. The converted serial video signal is supplied to a buffer 52a, where the signal is converted into a signal appropriate for an output operation and then outputted to the AUX output terminal 2a as the AUX output. While the configuration in the present embodiment has only one AUX output terminal, a plurality of AUX output terminals may be provided.

The video signal selected as the video signal to be outputted to the DVI output terminal 2d is supplied to an I/P (Interlace/Progressive) conversion/resizing processor 51d, where the video signal is converted into an interlaced or progressive video signal and the screen size is changed as necessary. The video signal having undergone the adjustment operations described above is outputted to a buffer 52d, where the video signal is converted into a signal appropriate for an output operation and outputted to the DVI output terminal 2d as the DVI output.

The control section 60 is formed of a CPU (Central Processing Unit) and other components and produces control signals for controlling the portions in the apparatus and camera control commands for controlling the cameras under control based on a variety of types of information inputted through the operation input unit 120.

The control section 60 includes a positional information producer 61, a control signal producer 62, and a serial I/F 63. The control section 60 is connected to a memory 70 formed of an EEPROM (Electrically Erasable Programmable Read Only Memory) or any other suitable component.

The positional information producer 61 in the control section 60 receives information on the operation angle inputted from the joy stick 240 on the operation input unit 120 and information indicating on/off of each of the operation buttons that form the operation input unit 120. The positional information producer 61 produces information indicating the position of any of the cameras under control, that is, information indicating the amounts of pan/tilt/zoom control, based on the information on the inputted operation angle of the joy stick 240, and supplies the produced positional information to the control signal producer 62 disposed downstream of the positional information producer 61.

The control signal producer 62 produces a camera control command based on the information on the operation angle inputted from the joy stick 240 on the operation input unit 120 and the information on a table stored in the memory 70. The control signal producer 62 also produces control signals for controlling the portions in the main unit 110 based on the operation button on/off information inputted through the operation button section 210 and the information contained the table stored in the memory 70.

The "table stored in the memory 70" described above is a logical number/input port number/camera-under-control number relationship table T1. An exemplary configuration of the logical number/input port number/camera-under-control number relationship table T1 will be described later with reference to FIG. 4. The preset information storage section 71 is provided in the memory 70, and a preset information table T2 is stored in the preset information storage section 71. The preset information table T2 will be described later in detail with reference to FIG. 5.

When the control signal producer 62 receives from the operation input unit 120 a signal indicating that the preset button 213 or the recall button 215 is pressed, the control signal producer 62 produces a control signal that instructs registration or readout of preset information. When the preset number specified as the destination to which or the source from which the preset information is written or read is any of the numbers ranging from 1 to n, the control signal producer 62 produces a camera control command. The produced camera control command is then transmitted to any of the cameras C1 to C3. Selecting a camera to which the camera control command is transmitted is carried out by the control section 60 based on the information indicating on/off of the AUX output selection/camera selection buttons 212 and the information contained in the logical number/input port number/camera-under-control number relationship table T1.

On the other hand, when the preset number specified as the destination to which or the source from which the preset information is written or read is any of the numbers ranging from n+1 to m, the control section 60 supplies a control signal to the preset information storage section 71 in the main unit 110.

That is, the control signal producer 62 refers to the logical number/input port number/camera-under-control number relationship table T1 to determine an object to be controlled, produces a control signal directed to the thus determined object to be controlled based on an operation inputted through the operation input unit 120, and supplies the control signal to the object to be controlled. Specifically, the camera control command produced by the control signal producer 62 is transferred to the serial I/F 63 disposed downstream of the control signal producer 62 and converted into a serial signal by the serial I/F 63. The camera control command converted into the serial signal is outputted to a control signal output terminal 2c via a serial driver 80 and transferred to any of the cameras C1 to C3 under control via the control signal output terminal 2c.

An exemplary configuration of the logical number/input port number/camera-under-control number relationship table T1 will be described with reference to FIG. 4. The logical number/input port number/camera-under-control number relationship table T1 shown in FIG. 4 shows the relationship among the logical numbers, the numbers assigned to the input ports, and the numbers assigned to the cameras under control. The numbers have been assigned to the input ports and the cameras under control in advance by menu-driven setting or any other suitable method.

In the example shown in FIG. 4, the logical number 1 is related to the input port number A and the camera-under-control number 1. The logical number 2 is related to the input port number B and the camera-under-control number 3. The logical number 3 is related to the input port number C but is not related to any camera-under-control number, because the input port number C is connected to a camera that is not controllable by the main unit 110 (for example, the camera C4 in FIG. 1), a VTR, or any other non-camera apparatus.

As described above, since the logical numbers, the input port numbers, the camera numbers are related to each other in the one-to-one relationship, pressing any of the buttons to which the logical numbers are assigned uniquely determines a camera or an apparatus to be controlled.

An exemplary configuration of the preset information table T2 will be described with reference to FIG. 5. The preset information table T2 is a table for managing preset information stored in the preset information storage section 71. The items contained in the table are "preset number," "clear bit," "camera model information," and "preset information."

The preset numbers in the preset information table T2, which are the numbers for managing the (n+1)-th preset information to the m-th preset information stored in the preset information storage section 71, range from n+1 to m. In the example shown in FIG. 5, it is assumed that n is 16, that is, the number of pieces of preset information storable on the camera side is 16. Since m is equal to 99 as described above, the preset numbers range from 17 to 99 (=m).

The "clear bit" is a flag that determines which of the information stored in the preset information table T2 or the default value is read when the user issues an instruction to read preset information. In the example shown in FIG. 5, "1" represents the use of the default value, and "0" represents the use of preset information. When the preset button 213 (see FIG. 2) on the operation input unit 120 is pressed, the value of the flag becomes "0" under the control of the control section 60, whereas when the clear button 216 is pressed, the value of the flag is changed to "1".

The "camera model information" contains information on the model of the camera connected at the time of preset information registration, that is, the camera in which preset information has been registered. The positions corresponding to the preset numbers No. 17, No. 18, and No. 99 store a model name "CAM-300," and the position corresponding to the preset number No. 19 store a model name "CAM-700."

The "camera model information" is used to check whether or not the camera connected at the time of preset information registration differs from the camera connected at the time of preset information readout. Since the type of camera control command to be used varies depending on the model of the camera in question, a camera control command inappropriate for the connected camera will be disadvantageously sent if the model of the camera connected at the time of preset information registration differs from the camera connected at the time of preset information readout. To prevent the situation described above, the control section 60 checks the model by using the "camera model information" before any preset information is read.

The "preset information" contains parameters that define the state of a camera. In the example shown in FIG. 5, the "preset information" includes "pan coordinate," "tilt coordinate," "zoom position," "focus position," and "iris position." For example, the position corresponding to the preset number No. 17 stores preset information formed of the following parameters: "pan coordinate"=30, "tilt coordinate"=20, "zoom position"=10, "focus position"=10, and "iris position"=20. In FIG. 5, the parameter in each of the items is expressed by a value, such as 10 and 20. In practice, however, each of the parameters is expressed by a bit string defined for each camera.

In FIG. 5, the number of items in the "preset information" is five to simplify the description. In practice, however, the number of items is greater, including an exposure setting and a white balance setting. In some existing cameras, the number of items in preset information is 37, and in other existing cameras, the number is 67.

A plurality of preset information tables T2 formed of the items described above is provided in accordance with the number of cameras under control that can be connected to the main unit 110. That is, the preset information table T2 is prepared for each of the logical numbers shown by way of example in FIG. 4. For example, when the number of connected cameras under control is 7 and m is 99, the number of pieces of preset information that can be stored in the preset information storage section 71 is 7×(99−n). The smallest one of the numbers n in all cameras under control is selected as the number n, which is subtracted from 99 (m). That is, when one of the cameras under control has a number n of 6, and 6 is the smallest of the numbers n in all cameras under control, the number of pieces of preset information that can be stored is 7×(99−6)=651.

[Exemplary Operation of Video Signal Processing Apparatus]

Exemplary processes of registering preset information carried out in the main unit 110 will be described with reference to the flowchart in FIG. 6. First, the control section 60 judges whether or not a preset information registering operation has been accepted (step S1). That is, it is judged whether or not the user has driven in advance any of the cameras under control to make a desired preset setting so that the position of the camera and internal parameters thereof are established and then has issued an instruction to register the preset information. When no registering operation has been carried out, the judgment process in the step S1 is repeated. When a preset information registering operation has been accepted, it is then judged whether or not the preset number selected as the destination to which the preset information is registered is any of the second half of the preset numbers ((n+1) or greater) (step S2).

When the inputted preset number is any of the first half of the preset numbers (n or smaller), a camera control command that instructs storage of the information on the current state of the camera in the preset information storage section M in the camera is transmitted to the connected camera (step S3). The preset information is stored in the preset information storage section M in the camera based on the camera control command. Since camera control command transmission uses a serial transmission path in the present example, the camera control command to be transmitted to the camera is divided into portions, which are then transmitted to the camera separately.

When the preset number selected by the user is any of the second half of the preset numbers, the control section 60 transmits to the connected camera an inquiry command for checking the model (step S4). When the main unit 110 receives the model information transmitted from the camera (step S5), the control section 60 writes the received model information in the preset information storage section 71 (step S6).

The main unit 110 then transmits to the connected camera an inquiry command for checking the state of the camera (step S7). When the main unit 110 receives a response to the inquiry command (a variety of parameters representing the state of the camera) (step S8), the received state information is stored in the preset information storage section 71 in the main unit 110 under the control of the control section 60 (step S9). The inquiry command transmission process in the step S7 and the state information reception process in the step S8 are also divided into portions, which are then carried out separately, as in the model checking inquiry command transmission and reception processes.

Finally, the user is visually informed whether or not the preset information has been successfully stored in the preset information storage section 71 (step S10). The preset registration process is thus completed.

Exemplary processes of reading preset information carried out in the main unit 110 will be described with reference to the flowchart in FIG. 7. First, the control section 60 judges whether or not a preset information reading instruction has been accepted (step S11). When the reading instruction has been accepted, the control section 60 transmits an inquiry command for checking the model to the connected camera (step S12).

It is then judged whether or not the preset number selected as the position in which the preset information that the user wants to read is stored is any of the second half of the preset numbers (step S13). When the selected preset number is any of the first half of the preset numbers, the main unit 110 transmits to the connected camera a camera control command that instructs readout of the preset information from the preset information storage section M in the camera. At the same time, a camera control command that instructs incorporation of the preset information into the state of the camera is transmitted (step S14).

When the selected preset number is any of the second half of the preset numbers, it is judged whether the model of the currently connected camera coincides with the camera model registered in the preset information table T2 (step S15). When the model of the currently connected camera does not coincide with the camera model described in the preset information table T2, the user is notified of the mismatch between the camera models (step S16). In this case, no preset information reading process is carried out, but the entire procedure is terminated.

When the camera models coincide with each other, the preset information is read from the preset information storage section 71 in the main unit 110 under the control of the control section 60 (step S17). A variety of drive commands are then produced based on the read preset information (step S18). The thus produced variety of drive commands include a pan drive command, a tilt drive command, a zoom drive command, a focus drive command, and an iris drive command, which are produced based on the preset information shown in FIG. 5.

The pan drive command and the tilt drive command are first transmitted (step S19), and then the zoom drive command is transmitted (step S20), followed by the transmission of the iris drive command (step S21). After the drive commands described above are transmitted, other drive commands are transmitted (step S22).

Carrying out the processes described above allows the camera states registered as preset information to be reproduced in the camera that has received the variety of drive commands in the following order: the panning, tilting, zooming, focusing, and iris setting.

[Advantages Provided in Embodiment]

According to the embodiment described above, since preset information is stored not only in the preset information storage section M in a camera but also in the preset information storage section 71 in the video signal processing apparatus 100, the capacity of storing preset information is increased.

Further, according to the embodiment described above, the preset information storage section 71 in the main unit 110 stores preset information the preset numbers of which range from n+1 to m. That is, for any number n, the preset information related to the preset numbers equal to or greater than n+1 is stored in the preset information storage section 71 in the main unit 110, whereby the capacity of storing preset information can be increased with no modification on the camera side at all. In particular, when an obsolete camera the number n of which is small is connected to the main unit 110, the number of pieces of storable preset information can be increased to m (99, for example). The convenience for the user is thus improved.

Even when a variety of models of camera the numbers n of which differ from one another are connected, the number of pieces of preset information that can be stored in the preset information storage section 71 in the main unit 110 is fixed to m. The user can therefore readily manage the preset information. That is, even when different models of camera are present, the user does not have to be careful about the number of pieces of preset information that can be stored for each of the cameras.

Further, according to the embodiment described above, since preset information can also be stored in a camera as done before, the camera can be connected to and used with another video signal processing apparatus 100 different from the one in which preset information on the camera has been registered. Moreover, when preset information is stored in a camera, the process of reading the preset information and incorporating it into the state of the camera can be carried out in a shorter period, whereby an advantage provided in the existing in-camera storage function is also provided.

Further, according to the embodiment described above, each piece of preset information is related to the corresponding preset number for management purposes. When the preset number is any of the first half of the preset numbers, the preset information is written or read to or from a camera under the control of the control section 60, whereas when the preset number is any of the second half of the preset numbers, the preset information is written or read to or from the video signal processing apparatus 100 under the control of the control section 60. That is, when the user selects a preset number in relation to which the user wants to write or read preset information, the user does not have to be careful about where the preset information will be or have been stored, the camera or the video signal processing apparatus 100.

Moreover, according to the embodiment described above, before preset information is registered in the main unit 110, the operation button section 210 and the joy stick 240 are used to set the position of a camera and internal parameters thereof at desired values. The main unit 110 then issues to the camera an inquiry command inquiring the current position of the camera and the current internal parameters thereof, and the information transmitted from the camera in response to the inquiry command is stored as preset information in the main unit 110. In this way, accurate parameter information (action parameters in the camera) for producing a desired state of the camera is registered as preset information in the main unit 110.

Further, according to the embodiment described above, a variety of drive commands produced in the control signal producer 62 in the main unit 110 are transmitted to a camera in the following order: the pan drive command, the tilt drive command, the zoom drive command, the focus drive command, and the iris drive command. On the camera side, the state of the camera is changed in the order of the received drive commands. In this way, the state of the camera is sequentially changed starting from a readily recognizable action, such as panning, tilting, and zooming. The user can therefore readily see how the preset information is incorporated (transition of one action of the camera to another).

2. Variations

The main unit 110 described above may have an edit function that allow the user to edit the contents of the preset information table T2. When the contents of the preset information table T2 can be edited, preset information can be moved, copied, and exchanged between cameras and preset numbers. Further, when the preset information table T2 is described in text and the syntax of texts is open to the public, the user can manually rewrite registered contents.

While the embodiment described above has been described with reference to the video signal processing apparatus 100 having the video switcher function and the camera control function, the invention may be applied to, for example, an apparatus having only the camera control function (camera controller).

The present application contains subject matter related to that disclosed in Japanese Priority Patent Application JP 2008-283629 filed in the Japan Patent Office on Nov. 4, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A camera control method comprising the steps of:
   selecting by a user a first or a second control information for controlling operating parameters of a camera, at least one of the first or second control information being adapted to control at least one of pan, tilt and zoom operations of the camera;
   sending command information to the camera to read out from a storage in the camera the first control information preset in the camera for controlling the camera in accordance with the first control information when the user selects the first control information for controlling operating parameters of the camera, the storage in the camera having a capacity of n pieces of information;
   reading out from a storage in camera control apparatus, physically separate from the camera, preset camera command information for controlling operating parameters of the camera, the storage in the camera control apparatus having a capacity greater than n pieces of information;
   checking whether camera model information stored in the storage in the camera control apparatus is the same as model information of the camera connected to the camera control apparatus; and
   sending to the camera the read out preset camera command information for controlling the parameters of the camera when the user selects the second control information.

2. The camera control method according to claim 1, wherein the first control information is preset in the camera in response to a command sent to camera.

3. The camera control method according to claim 1, wherein the first control information includes information for providing pan, tilt, zoom position, and focus position of the camera.

4. A camera control system comprising:
   at least one camera;
   a storage in the camera for storing first control information preset in the camera for controlling operating parameters of the camera, the storage in the camera having a capacity of n pieces of information;
   a user-operated input configured for operation by a user to select first or second control information, at least one of the first or second control information being adapted to control at least one of pan, tilt and zoom operations of the camera; and
   camera control apparatus physically separate from the camera and configured to send command information to the camera to read out from the storage in the camera the first control information for controlling the camera in accordance with the first control information when the user selects the first control information, the camera control apparatus including a storage having a capacity greater than n pieces of information; and to send to the camera command information corresponding to the second control information preset in storage in the camera control apparatus for controlling parameters of the camera when the user selects the second control information if camera model information stored in the storage in the camera control apparatus is the same as model information of the camera connected to the camera control apparatus.

5. The system according to claim 4, wherein the first control information is preset in the camera in the response to a command sent to camera.

6. The system according to claim 4, wherein the first control information includes information for providing pan, tilt, zoom position, and focus position of the camera.

7. Camera control apparatus for controlling at least one camera physically separate from and coupled to the camera control apparatus, wherein the at least one camera includes a storage having a capacity of n pieces of information, the camera control apparatus comprising:
   a user-operated input configured for operation by a user to select first or second control information, at least one of the first or second control information being adapted to control at least one of pan, tilt and zoom operations of the camera; and
   a controller configured to send command information to the camera to read out from the storage in the camera the first control information preset in the camera for controlling the camera in accordance with the first control information when the user selects the first control information, the camera control apparatus including a storage having a capacity greater than n pieces of information; and to send to the camera command information corresponding to the second control information preset in the storage in the camera control apparatus for controlling operating parameters of the camera when the user selects the second control information if camera model information stored in the storage in the camera control apparatus is the same as model information of the camera connected to the camera control apparatus.

8. The camera control apparatus according to claim 7, wherein the first control information is preset in the camera in response to a command sent to camera.

9. The camera control apparatus according to claim 7, wherein the first control information includes information for providing pan, tilt, zoom position, and focus position of the camera.

* * * * *